July 2, 1935.  W. W. HALLE  2,006,548
MANUFACTURE OF CONTAINERS
Original Filed Feb. 4, 1930
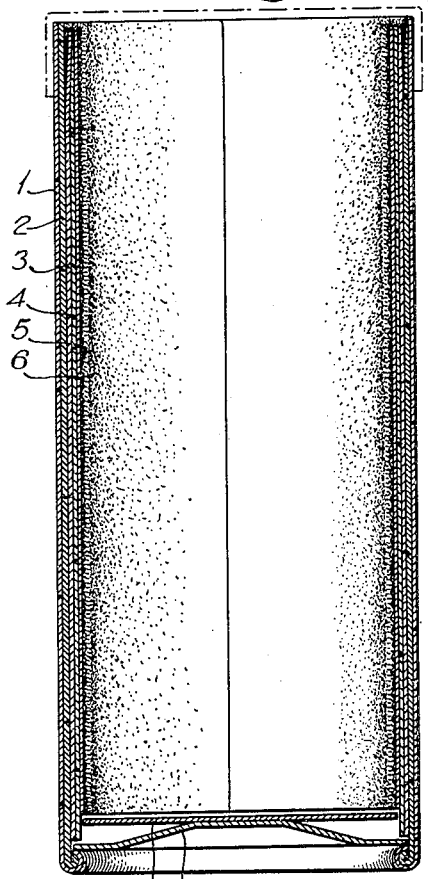
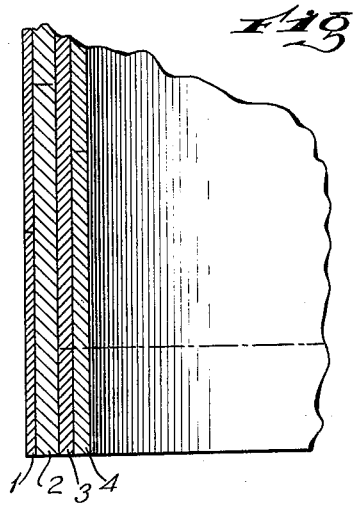
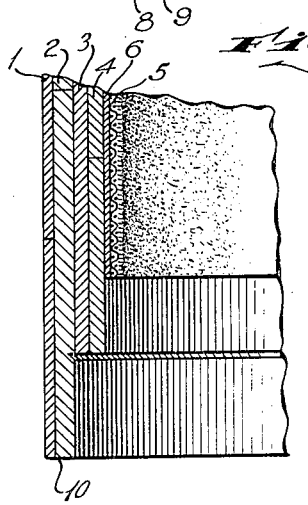
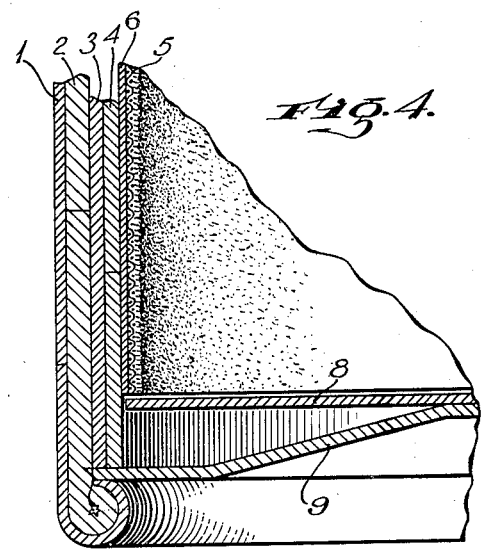
INVENTOR.
William W Halle
BY Jeffrey Kimball ...
ATTORNEYS.

Patented July 2, 1935

2,006,548

UNITED STATES PATENT OFFICE 2,006,548

MANUFACTURE OF CONTAINERS

William W. Halle, Newark, N. J., assignor to Seeley Tube & Box Company, Newark, N. J., a corporation of New Jersey Original application February 5, 1930, Serial No. 425,951. Divided and this application July 6, 1932, Serial No. 621,000

3 Claims. (Cl. 93—55)

The invention is a method of making pasteboard containers suitable for holding fragile articles such as the wax sound records of dictating machines and the like, and which require to have relatively thick and strong body walls, the object of the invention being to reduce the cost of manufacture of such containers, as will hereinafter appear, this application being a division of Ser. No. 425,951, filed February 5, 1930 Patent No. 1,907,797.

Fig. 1 of the accompanying drawing represents a longitudinal central section of a container made according to the new process by way of example. Fig. 2 a magnified section of its body wall, Fig. 3 a similar cross section of the bottom seam in an intermediate stage of the process and Fig. 4 a similar section of the completed seam.

The container body, which is cylindrical, is made by winding and overlapping successive layers of ordinary chip-board ribbon stock on a mandrel in the usual way but omitting any glue between two of the intermediate layers. In the present case there are four such layers marked 1, 2, 3 and 4 respectively, wound spirally upon each other, layers 1 and 2 and layers 3 and 4 being respectively glued to each other, but layers 2 and 3 being unglued and secured to each other only by the friction incident to the winding. The number of layers may be as desired. Preferably the outermost of the two unglued layers, i. e., the layer 2, is made of slightly heavier stock than the others for a reason presently explained. The resulting tube is cut in proper lengths to form the container body, which is thus, in the present case, a four-ply body and correspondingly strong. For use in holding wax records such a body is commonly provided with a lining of nap-sheeting or soft flannel-like fabric 5 carried on a chip-board lining sleeve 6, which sleeve may be introduced into the body either before or after the bottom closure is applied. The nap-sheeting is glued to the face of the sleeve and its top edge is turned over the top edge of the sleeve to make a neat finish at the top of the container, as indicated. This is done while the sleeve is flat, after which it is introduced into the body, in a curled condition and allowed to expand against the inner face of the body being secured thereto by a couple of dabs of glue. As stated, the lining is not essential except where required by the nature of the contained article.

The two inner layers, 3 and 4, are then skived off about along the dotted line in Fig. 2, to form an interior rebate shoulder as indicated at 7 in Fig. 3. This cutting is done by an internal expanding cutter rotated in the end of the body and set to cut through just those layers which are inside of the unglued interface, the resulting ring, composed of the severed ends of such layers (3 and 4) being easily separated from the body because of the absence of glue. By glue, as herein used, is meant any adhesive which if present in the interface would prevent separation of the ring. The layer 2 is of greater thickness than the others so that the cut made by the skiving tool, which must necessarily pass entirely through the two inside layers, scoring the layer 2, will not unduly weaken it. When the rebate has thus been formed, the circular cardboard bumper disc 8 is inserted and laid against the lower end of the lining sleeve 6, if that is present, and then a hard fibre bottom disc 9 constituting the end closure of the container is placed on the rebate shoulder 7 and finally the reduced and relatively thin rebate lip or flange 10, produced by the skiving, is crimped over inwardly upon the disc 9 binding it securely in place, against the shoulder. Because this rebate lip is of proper thickness and thinner than the body wall, which latter must be thick in order to be strong, it can be curled over and upon itself to form a crimped seam or joint which is materially stronger than it would be if it were attempted to make it by curling over the full thickness of the body wall as heretofore. The crimping or curling over can thus approximate 360° which makes a securely locked seam. It will be understood therefore that according to this invention, the location of the unglued interface and the number of layers removed to make the rebate are predetermined to leave a rebate lip of length and thickness suited to make the most efficient crimp, least likely to uncurl in use. Obviously the particular thickness depends on the material of the ribbon stock and to some extent on the diameter of the container and will therefore vary for different styles of containers but the manufacturer will have no difficulty in determining this detail. A decorative paper covering may then be applied to the outer face of the body, and if so, is included in the crimp, though not shown in the drawing.

The hard fibre bottom disc 9 is shown bossed inwardly at its centre to form a central upstanding seat for the bumper disc 8, which latter is confined in place by the lower end of the lining sleeve 6 and will be understood to be intended to have sufficient clearance from the body wall to act as a yielding cushion to the pressure or impact of a wax record.

I claim:

1. The method of making containers which consists in forming a tubular body out of plural layers of paper-stock with a non-glued interface between two of the layers, internally cutting off and removing a portion of the layers interior of such non-glued interface to form a rebate in the end of said body, applying an end wall to the rebate shoulder and crimping the rebate lip inwardly upon the margin of said end wall.

2. The method of making containers which consists in spirally winding and gluing together a plurality of superposed layers of paper-stock, omitting the glue between two of such layers to form an unglued interface, internally cutting off and removing the terminal portion of the stock interior of such unglued interface to form a rebate shoulder, applying an end wall to the rebate shoulder and crimping the rebate lip over and upon said end wall.

3. The method of making containers which consists in forming a tubular body out of plural layers of paper-stock with a non-glued interface between two of the layers, the other layers being glued together and the layers next outside said interface being heavier than the others, internally cutting through the layer or layers on the inner side of said non-glued interface and into said heavier layer, removing the cut-off ends of said inner layer or layers to form a rebate on the end of the container body, and applying an end closure to said body within the rebated end thereof.

WILLIAM W. HALLE.